April 19, 1949.  C. A. THOMAS  2,467,949
STRIP CUP
Filed Feb. 17, 1945
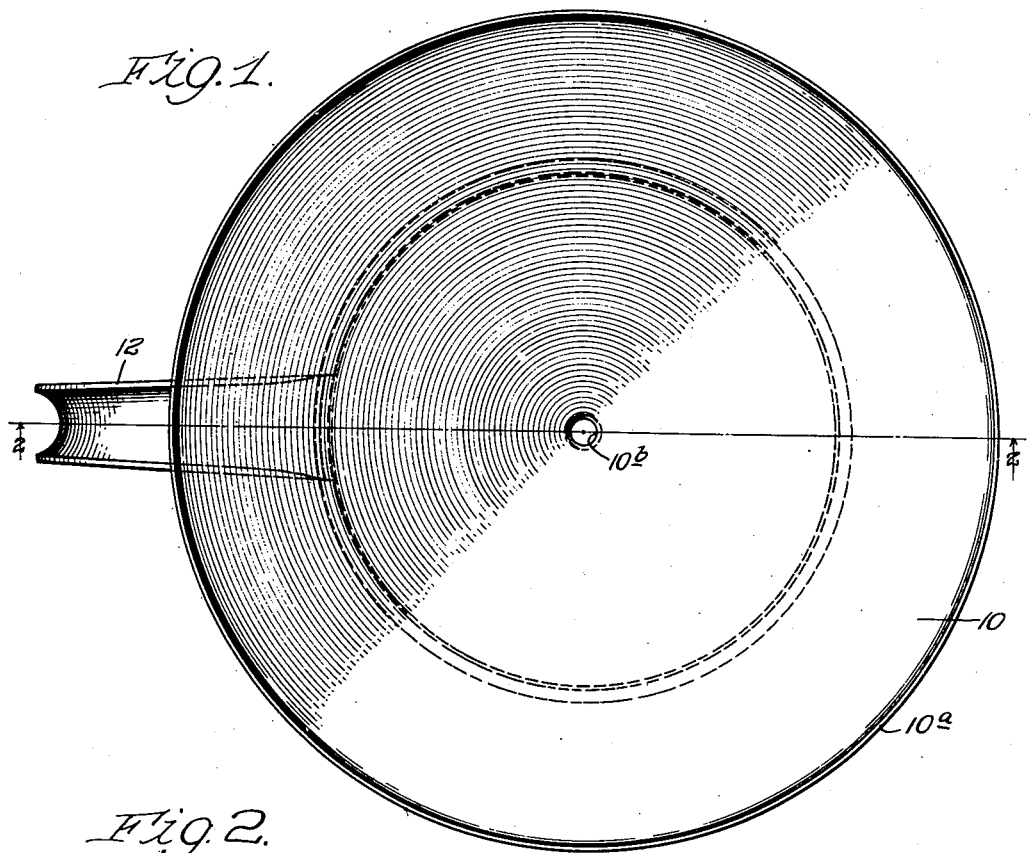
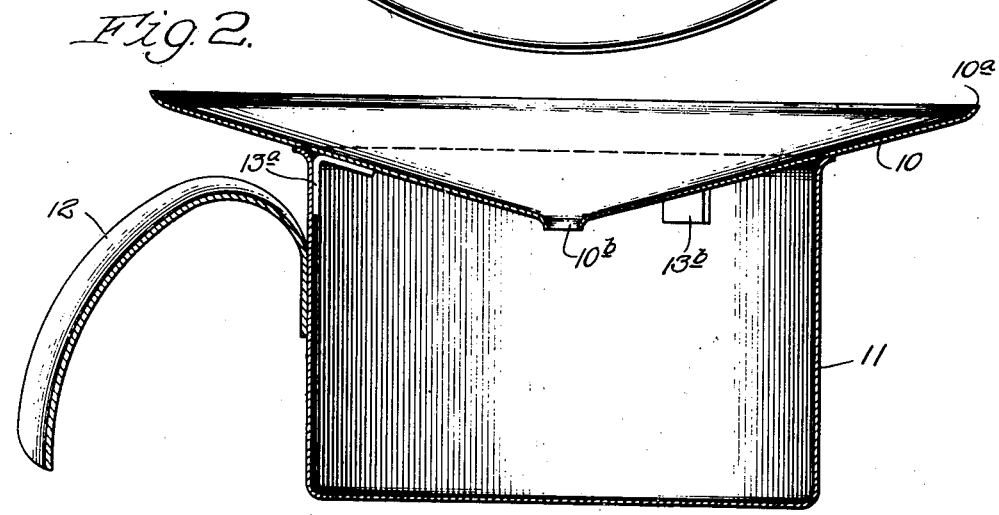
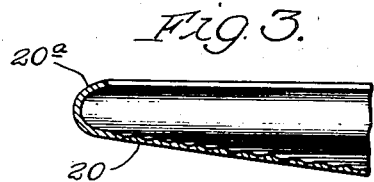
Inventor:
Chester A. Thomas,
By Chritton, Wiles, Schroeder, Merriam,
and Hofgren, Attys.

Patented Apr. 19, 1949

2,467,949

UNITED STATES PATENT OFFICE 2,467,949

STRIP CUP

Chester A. Thomas, Crystal Lake, Ill., assignor to Babson Bros. Co., a corporation of Illinois Application February 17, 1945, Serial No. 578,545

3 Claims. (Cl. 88—14)

This invention relates to a strip cup, and more particularly to a device specially designed to test for certain conditions in milk during the stripping of the foremilk from a cow before milking her.

One feature of this invention is that it provides very effective means for making a preliminary test of milk where garget or mastitis is suspected; another feature of this invention is that the testing function is combined with means for receiving and storing foremilk which is preferably stripped from the teats before milking, particularly where such milking is to be done by a machine; yet another feature of this invention is that the particular quarter of the udder affected may be readily determined; and still another feature of this invention is that the device is so constructed and arranged as to be easily and conveniently cleaned. Other features and advantages of this invention will be apparent from the following specification and the drawings, in which:

Figure 1 is a top plan view of a strip cut embodying my invention; Figure 2 is a vertical sectional view along the line 2—2 of Figure 1; and Figure 3 is a fragmentary sectional view of a modified form of my invention.

A good dairy herd of pedigreed cows represents a very considerable capital investment, and a large number of factors influence the milk production, both in quantity and value, of such a herd. In a well run dairy, the barns and stalls are kept as clean as possible and the cows are milked and handled with every attention to detail. Even under such conditions, however, various bovine diseases appear, and the dairy man must be constantly on the watch for these and do everything in his power to keep the trouble from spreading through his herd. Bovine tuberculosis may be considered as substantially conquered, as a result of several decades of effort on the part of dairy men. Not that such disease no longer appears, but that it is seldom a threat to whole herds. Bang's disease is also receiving considerable attention, and may be considered definitely on the decline.

Another very prevalent difficulty, however, is known as garget or mastitis, and attacks the udder of the cow. This generally attacks one quarter of the udder at a time, causing severe shrinkage of the affected quarter, with substantially complete stoppage of milk production thereby. A cow with garget or mastitis (the terms being generally used synonymously) not only has her milk and butter fat production reduced about 25% but has the quality of the remaining milk very badly affected, such milk generally being refused for fluid consumption. Moreover, if a dairy man is not watchful for this difficulty, can after can of milk will be refused without his realizing that the taste or odor is caused by garget or without his knowing which cow is at fault. It is estimated that garget costs the dairy industry many millions of dollars per year. Some garget is caused by severe bruising or chilling of the udder, but dairy authorities estimate that more than 70% of garget is caused by a bacteria known as streptococcus-agalactiae.

Whatever the cause, it has been found that milk from a quarter affected with garget, even in early stages, will be "flaky," this term being used in the dairy industry to indicate that there are small clots or strings in the milk. In the more advanced stages there may even be bloody material in the milk. The sanitary measures used in a well run dairy to reduce the bacterial count in the milk include not only wiping the udder clean with a cloth moistened with chlorine solution before milking but also discarding the foremilk, which is generally very high in bacterial count. Removal of the foremilk is generally done by a strip cup, something in the neighborhood of a tablespoon full being removed from each teat by stripping before the milker inflations are placed in position, where milking is by a machine.

I have found that garget can be detected very early by examination of the milk for strings or clots, and I have devised and am here disclosing a combined strip cup and testing arrangement which fulfills all of the functions of the ordinary strip cup, and provides in addition a very effective means of examining the foremilk in a very thin film and under conditions which quickly show up the presence of any clots or strings. I do this by providing an initial milk receiving or testing surface having a dark colored (preferably black) finish and arranged at a slight angle to the horizontal, so that the milk stripped out of each teat spreads out in a thin film of substantial area, with any clots or strings being very visible against the dark colored surface; and by arranging this in conjunction with a reservoir or cupped portion receiving the milk from the testing surface, so that the strip cup can be used for a number of teats without any necessity of intermediate cleaning or emptying.

Referring now more particularly to the specific embodiment of my invention illustrated in Figures 1 and 2, the testing or upper portion of the device comprises a cone-shaped member here identified as 10. In a commercial embodiment of my invention this has a diameter of about 8 inches, so that it provides a substantial horizontal area, speaking with respect to the position of the device as shown on the drawing and as normally used. The cone is a rather shallow one, the angle of the sides of the cone to the horizontal not exceeding 30° and preferably being slightly less than 20° as shown. An upturned rim or flange 10a is provided entirely around the outer edge of this conical portion to minimize loss of milk over the outer edge during stripping. Preferably each teat is stripped on to about one-quarter of the area of the conical member with an arcuate "flip" such that the milk from the teat being stripped strikes the conical member out slightly beyond half way from the center to the edge in an arcuate path, the milk then flowing down toward the center to a central discharge opening 10b at the apex. The upper surface of the conical member 10 is preferably finished in a dark color, as a dull black baked enamel, and the milk spreads out in a thin film which immediately shows up any clots, strings or bloody material therein.

Milk flowing down through the discharge opening 10b is received and stored in a cup or reservoir member 11, which may for example have a diameter of about 4 inches and be about 3½ inches high, so that it will hold the foremilk from at least twenty to thirty cows before requiring emptying. This cup is provided with a handle 12 for convenience in holding the device with one hand while stripping is being done with the other hand. The cup and cone are removably attached to each other in a manner here shown as comprising three bracket or finger portions as 13a and 13b illustrated in Figure 2. These are rigidly attached to the bottom of the cone and adapted to be a sliding frictional fit within the inner walls of the cup member 11. By this arrangement the two parts are held in desired operative relation during use, but can be very readily separated for emptying of the cup 11, and for washing and sterilizing both portions of the device. The conical or testing portion, to be useful, should have or subtend a substantial horizontal area, as mentioned heretofore; and the cup portion should preferably be of considerably smaller horizontal area or cross sectional size for convenience of handling. The handle 12, rigidly attached to the cup member 11, should preferably extend out beyond the edge of the conical member 10.

Referring more particularly to Figure 3, I have found it sometimes desirable to finish the outer edge of the conical member here identified as 20 (corresponding to the member 10 in Figures 1 and 2) with a rim which is not only upwardly but inwardly turned, this rim being here identified as 20a. As before, the rim extends entirely around the conical member; and the fact that it is inwardly turned throws back into the cone any milk which tends to spread out, with an outward or radial component of motion, because of improper direction of the stream from the teat or because of splashing when the stream hits the upper surface of the member 20. It has also sometimes proved desirable to provide the upper surface of the conical member, as the member 20 in Figure 3, with annular corrugations. That is, by die stamping or other forming, the upper surface may be provided with alternate annular raised and depressed portions. This tends to slow down the movement of the milk toward the central discharge opening, and more positively ensures showing up of any clots or strings in the milk.

Whatever the form of my device, it will be understood that it will be used as a strip cup before milking, with careful inspection of the surface of the conical member as milk is spread thereon by stripping the foremilk from each teat. If the milk appears at all "flaky," the cow must be suspected. The operator should not only notice which quarter gave the flaky milk but should also immediately segregate that cow from the rest of the herd, and segregate any milk taken from her from other milk resulting from the general milking of the herd. The milk drawn from this cow, and particularly that drawn from the suspected quarter, can then be subjected to chemical or electrical tests for its pH. Normal milk is slightly acid with a pH generally of 6.5 or 6.6, whereas when garget is present the milk becomes more definitely neutral or even definitely on the alkaline side with a pH running from 6.9 to 7.4 If the pH test still further confirms the presence of garget, the milk is preferably examined under a microscope in a bacteriological laboratory for definite determination of the presence or absence of garget bacteria. At present there is no definite cure for garget so that if it is located the cow should no longer be considered a milk producer, and should be slaughtered for meat or otherwise disposed of. The milk is not only unsatisfactory as fluid milk but is even unsatisfactory for the making of cheese or condensed milk, the changes in the milk resulting from the presence of garget bacteria undesirably affecting these processes.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A strip cup of the character described for receiving and storing milk, including: a conical milk-receiving portion of substantial transverse area having a surface with a small angle of inclination, said surface retarding the flow of milk received directly from the udder of a cow and causing said milk to spread out in a thin film, said conical portion having a relatively small discharge opening at the apex thereof; a reservoir cup portion of lesser transverse area than said milk-receiving portion but of substantially greater transverse area than said discharge opening, said reservoir being large enough to receive milk stripped from a plurality of cows; and a plurality of fastening members on said milk-receiving portion, said fastening members engaging said reservoir portion and readily removably attaching said reservoir portion to said milk-receiving portion.

2. A strip cup of the character described for receiving and storing milk, including: a conical milk-receiving portion of substantial transverse area having a surface with a small angle in inclination, said surface retarding the flow of milk received directly from the udder of an animal and causing said milk to spread out in a thin film, said conical portion having a relatively small discharge opening at the apex thereof; a reservoir cup portion of lesser transverse area than said milk-receiving portion but of substantially greater transverse area than said discharge opening, said reservoir being large enough to receive milk stripped from a plurality of animals; and fastening means for readily removably attaching said reservoir portion to said conical portion.

3. Apparatus of the character claimed in claim 2, wherein said milk retarding surface has a plurality of annular corrugations thereon and a dark colored finish.

CHESTER A. THOMAS.

REFERENCES CITED

The following references are of record in the file of this patent:

UNITED STATES PATENTS

| Number | Name | Date |
|---|---|---|
| 203,868 | Adams | May 21, 1878 |
| 298,504 | Robinson | May 13, 1884 |
| 426,667 | Grissim | Apr. 29, 1890 |
| 523,488 | Scoville et al. | July 24, 1894 |
| 773,960 | Moore | Nov. 1, 1904 |
| 858,393 | Horner | July 2, 1907 |
| 1,048,546 | Ketcham | Dec. 31, 1912 |
| 1,283,910 | Robertshaw | Nov. 5, 1918 |
| 1,667,776 | Elofson | May 1, 1928 |
| 1,773,261 | Higby et al. | Oct. 29, 1929 |
| 2,162,156 | Case | June 13, 1939 |
| 2,337,869 | Chapman | Dec. 28, 1943 |
| 2,411,384 | Miller et al. | Nov. 19, 1946 |

FOREIGN PATENTS

| Number | Country | Date |
|---|---|---|
| 181,628 | Great Britain | June 22, 1922 |
| 497,126 | Great Britain | Dec. 13, 1938 |

Certificate of Correction

Patent No. 2,467,949.

April 19, 1949.

CHESTER A. THOMAS

It is hereby certified that errors appear in the printed specification of the above numbered patent requiring correction as follows:

Column 1, line 23, for the word "cut" read *cup*; column 3, line 47, before "useful" insert *most*;

and that the said Letters Patent should be read with these corrections therein that the same may conform to the record of the case in the Patent Office.

Signed and sealed this 4th day of October, A. D. 1949.

[SEAL]

THOMAS F. MURPHY,
*Assistant Commissioner of Patents.*